United States Patent [19]

Mizuta

[11] Patent Number: 5,056,009

[45] Date of Patent: Oct. 8, 1991

[54] IC MEMORY CARD INCORPORATING SOFTWARE COPY PROTECTION

[75] Inventor: Masaharu Mizuta, Itami, Japan

[73] Assignee: Mitsubishi Denki Kabushiki Kaisha, Japan

[21] Appl. No.: 334,436

[22] Filed: Apr. 7, 1989

[30] Foreign Application Priority Data

Aug. 3, 1988 [JP] Japan ............................. 63-192668

[51] Int. Cl.[5] .................... G06F 1/00; G06F 12/00; G06F 12/14

[52] U.S. Cl. ................................ 364/200; 364/232.8; 364/243.3; 364/244; 364/244.1; 364/244.6; 364/253; 364/253.2; 364/246.6; 364/925.6; 364/927.8; 364/929.61; 364/940.71; 364/953.3; 364/954; 364/954.2; 364/956; 364/956.2; 364/957.3; 364/957.4; 364/969; 364/969.4

[58] Field of Search ... 364/200 MS File, 900 MS File; 235/380

[56] References Cited

U.S. PATENT DOCUMENTS

| | | | |
|---|---|---|---|
| 4,525,599 | 6/1985 | Curran et al. | 178/22.08 |
| 4,558,176 | 12/1985 | Arnold et al. | 178/22.08 |
| 4,573,119 | 2/1986 | Westheimer et al. | 364/200 |
| 4,644,493 | 2/1987 | Chandra et al. | 364/900 |
| 4,685,056 | 8/1987 | Barnsdale, Jr. et al. | 364/200 |
| 4,698,750 | 10/1987 | Wilkie et al. | 364/200 |
| 4,734,568 | 3/1988 | Watanabe | 235/487 |
| 4,823,308 | 4/1989 | Knight | 364/900 |
| 4,879,645 | 11/1989 | Tamada et al. | 364/200 |
| 4,882,474 | 11/1989 | Anderl et al. | 235/380 |
| 4,903,296 | 2/1990 | Chandra et al. | 380/4 |

Primary Examiner—Thomas C. Lee
Assistant Examiner—Krisna Lim
Attorney, Agent, or Firm—Leydig, Voit & Mayer

[57] ABSTRACT

A storage portion for a ROM card for storing a distribution software comprises a software storage memory (ROM region) and a temporary memory (RAM region). A memory address trap circuit, when a predetermined specific address is designated, selects a temporary memory portion as an alternative to the software storage memory, while it selects a software storage memory when an address other than the specific address is designated. A software protection program stored, together with the distribution software, or as a sub-routine of the distribution software in the software storage memory, is executed by a program executing portion of a peripheral device to which the card is connected. The software protection program checks the medium in which this software protection program itself is stored to determine whether this medium can be data-accessed as a RAM region when the above-described specific address is designated, while, when an address other than the specific address is designated, it checks whether the medium can be data-accessed as the ROM region. If a desired result cannot be obtained, software protection program determines that the distribution software including the software protection program is unlawfully copied software and prevents its execution.

5 Claims, 5 Drawing Sheets ium chips 31 and 32, respectively. Output enable control lines ($\overline{OE}$) 42 extending from outside the IC memory card for the purpose of controlling data reading are further connected to each of the ROM chips 31 and 32. In the case of FIG. 2, an upper address signal for the upper address line 5 comprises one bit which corresponds to the most-significant address A15 (the number of bits are determined by the number of memory chips which form the memory chip portion). The lower address signal for the lower address bus 6 comprises 15 bits (since the memory capacity of the memory chip is 32 K bytes) which correspond to bit A0 from the lower address to bit A14 of the upper address. Furthermore, the data signal for two way data bus 7 comprises, for example, 8 bits which correspond to data $D_0$ to $D_7$. In FIG. 2, in order to simplify the description, although the memory chip portion 3 comprises two ROM chips 31 and 32, the same is generally formed by a greater number of memory elements. In that case, the basic operation is not changed, but the number of bits in the upper address line 5, and the number of the chip select control lines 43 and 44 from the chip select circuit 2 are increased.

IC MEMORY CARD INCORPORATING SOFTWARE COPY PROTECTION

BACKGROUND OF THE INVENTION

1. Field of the Invention

The present invention relates to an IC memory card preventing unlawful copying of information such as programs or data stored in the IC memory card onto other media.

2. Description of the Related Art

It is a serious problem for suppliers of software to take effective counter-measures against unlawful copying. Software suppliers have not been able to take positive countermeasures against unlawful copying since there is a risk of adversely affecting the service provided for legitimate users because of such factors as:

(1) copying to a RAM disk or a hard disk is needed since, otherwise, access speed is low; and (2) backup copies are necessary since access reliability is low, that is, since a multiplicity of read errors or write errors can occur at the time of reading and writing.

On the other hand, IC memory cards that include a RAM or ROM, i.e., a semiconductor memory IC, exhibit a significantly faster access speed than hard disks, and, furthermore, they show excellent access reliability with respect to the same. Thus, even if positive countermeasures against unlawful copying are taken in an IC memory card in which software is stored, it is considered that no problems are likely to arise for legitimate users.

Consequently, the provision of an IC memory card in which effective countermeasures against unlawful copying can be easily taken would represent a great step forward facilitating the wide use of IC cards as an alternative to the conventional floppy disks which can easily be copied unlawfully.

FIG. 1 is a block diagram illustrating the basic internal structure of a conventional IC memory card published in "IC Memory Card Guide Line" published by the Personal Computer Committee, Japan Electronics Industry Association, in September 1986. Referring to this drawing, a memory chip portion 3 generally comprises a plurality of RAM or ROM chips (see FIG. 2); (however, in the case of the RAM chips, an internal power source needs to be provided). An interface connector 1 is a connector for establishing connection with a peripheral equipment. A lower address bus 6 and data bus 7 are directly connected to each of the memory chips in the memory chip portion 3 from the interface connector 1. A control bus 4 and an upper address bus or line 5 are connected to a chip select circuit 2 for selecting a designated memory chip in the memory chip portion 3 from the interface connector 1. The control bus 4 is further connected to each of the memory chips in the memory chip portion 3 from the chip select circuit 2. In this state, the upper address is an address for determining which memory chip in the memory chip portion 3 is selected, while the lower address is an address in each of the memory chips. An external power source line 8 which may be connected to a power source (omitted from illustration) disposed outside the IC memory card extends from the interface connector 1 to the memory chip portion 3 and the chip select circuit 2, respectively.

FIG. 2 is a block diagram which in further detail illustrates the memory chip portion 3 and the chip select circuit 2 of the block diagram shown in FIG. 1. In this drawing, the same or equivalent parts shown in FIG. 1 are given the same reference numerals. Referring to this drawing, the chip select circuit 2 is composed of, for example, a general purpose gate IC "74HC138", while the memory chip portion 3 comprises, for example, two ROM chips 31 and 32, each of which has a storing capacity of 32K bytes. A card enable control line (CE) 41 for selecting a specific IC memory card extending from outside the IC memory card is connected to the chip select circuit 2. Chip select control lines ($\overline{CS1}$ and $\overline{CS2}$) 43 and 44 connect this chip select circuit 2 and the ROM chips 31 and 32, respectively. Output enable control lines ($\overline{OE}$) 42 extending from outside the IC memory card for the purpose of controlling data reading are further connected to each of the ROM chips 31 and 32.

Since conventional IC cards are formed as described above, a problem arises that the software stored in the IC memory card can be easily read out and copied to another floppy disk, hard disk, or IC card. Therefore, the thus-copied software can be easily executed not only by IC memory cards but also by a variety of media into which it has been unlawfully copied.

SUMMARY OF THE INVENTION

To this end, an object of the present invention is to provide an IC memory card which is obtained merely by adding a simple circuit to the internal circuit of a known IC memory card but yet capable of offering advantages such as prevention of unlawful copying and execution of software, as well as increasing its value.

In order to achieve the above-described object, an IC memory card according to the present invention comprises storage means including a software storage memory portion which constitutes a ROM region capable of storing a distribution software and which enables only reading and a temporary memory portion which forms a RAM region which permits both reading and writing; means for supplying a variety of control signals together with an address and data to the storage means; data reading and writing means arranged in such a manner that, when a predetermined specific address in the software storage memory portion of the storage means is designated, data write and read is performed in the temporary memory portion as an alternative to read and write in the specific address portion of the software storage memory portion by bringing the temporary memory portion of the storage means into an operable state, while, when an address other than the above-described specific address is designated, data read is performed in the designated address in the software storage memory portion; and a software protection program stored in the software memory portion together with the distribution software, the protection program checking the storage means in such a manner that, when it designates a predetermined specific address in the software storage memory portion, the designated predetermined specific address area can be accessed as a RAM region, whereas, when it designates any address other than the specific address, the address area other than that of the specific address can be accessed as a ROM region, and, if the above desired result of check cannot be obtained, the execution of the distribution software is prevented; wherein the software protection program is executed at a desired time before execution of the distribution software or during execution of the same.

In an IC memory card (ROM card) according to the present invention, storage means thereof comprises a memory portion for storing software which serves as a ROM region and a temporary memory portion which serves as a RAM region. The storage means and the reading and writing means are arranged so that, when a peripheral unit to which the IC card is connected designates a predetermined specific address, a memory address trap circuit, to be described later, included in data reading and writing means selects the temporary memory portion as an alternative to the memory portion of the above-described storage means to place the temporary memory portion in an accessible state, and on the other hand, when the peripheral unit designates an address other than the specific address, the memory address trap circuit selects the original memory portion. Furthermore, the memory portion for storing software stores a software protection program in addition to the distribution software. This software protection program is executed before or during the execution of the distribution program by, similarly to the distribution software, a program execution portion in the peripheral unit to which the IC memory card is connected. This software protection program, using the difference in data writing characteristics involved by the ROM region and the RAM region, determines from an optional address area of this medium whether the specific address area in the medium in which this software protection program itself is stored can be accessed as the ROM region (write prohibited)or whether, the specific address area that can be accessed as the RAM region (write enable). If the desired result cannot be obtained, this software protection program determines that the distribution software including this software protection program itself is software which has been unlawfully copied to a medium such as a floppy disk or a RAM card in which write and read can be performed or a medium such as a ROM card in which only reading can be performed in general. As a result of this determination, actual execution of the distribution software, that is, the shift to the application program, is refused. That is, it is capable of unlawfully copying the distribution software stored in a master IC card having the structure of the present invention, and the distribution software includes the software protection program of the present invention, However, in this case, since such media to which the above distribution software is copied unlawfully does not have the structure of the IC card according to the present invention, it can be determined that this distribution software that is read out from a medium in which an unlawful copying has taken place. Consequently, the unlawfully copied distribution software is not executed.

DESCRIPTION OF THE PREFERRED EMBODIMENT

An embodiment of the present invention will now be described with reference to the drawings.

Figure 1:
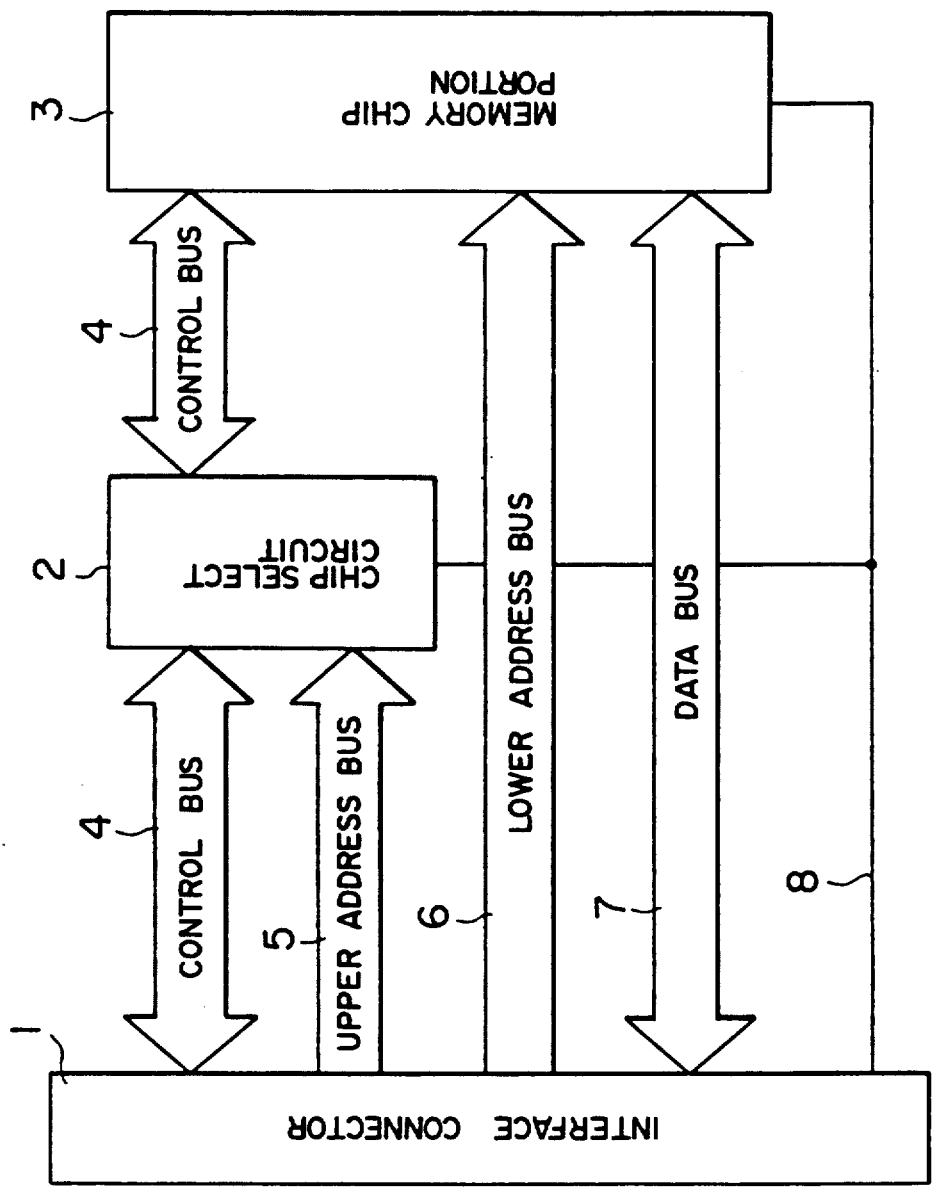
FIG. 1 is a block diagram illustrating the internal structure of a conventional IC memory card.
Figure 2:
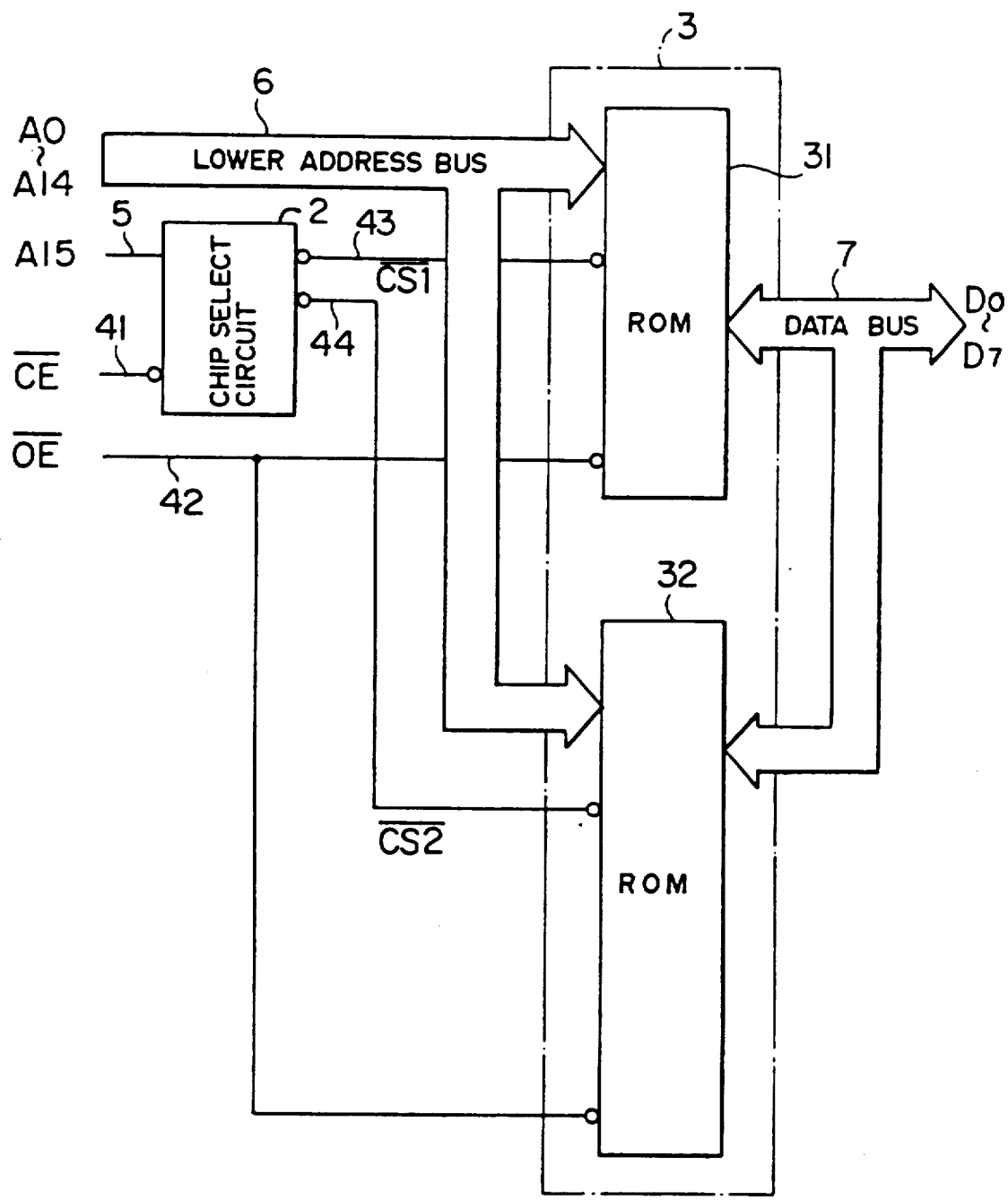
FIG. 2 is a block diagram illustrating in detail the structure of the memory chip portion shown in FIG. 1.
Figure 3:
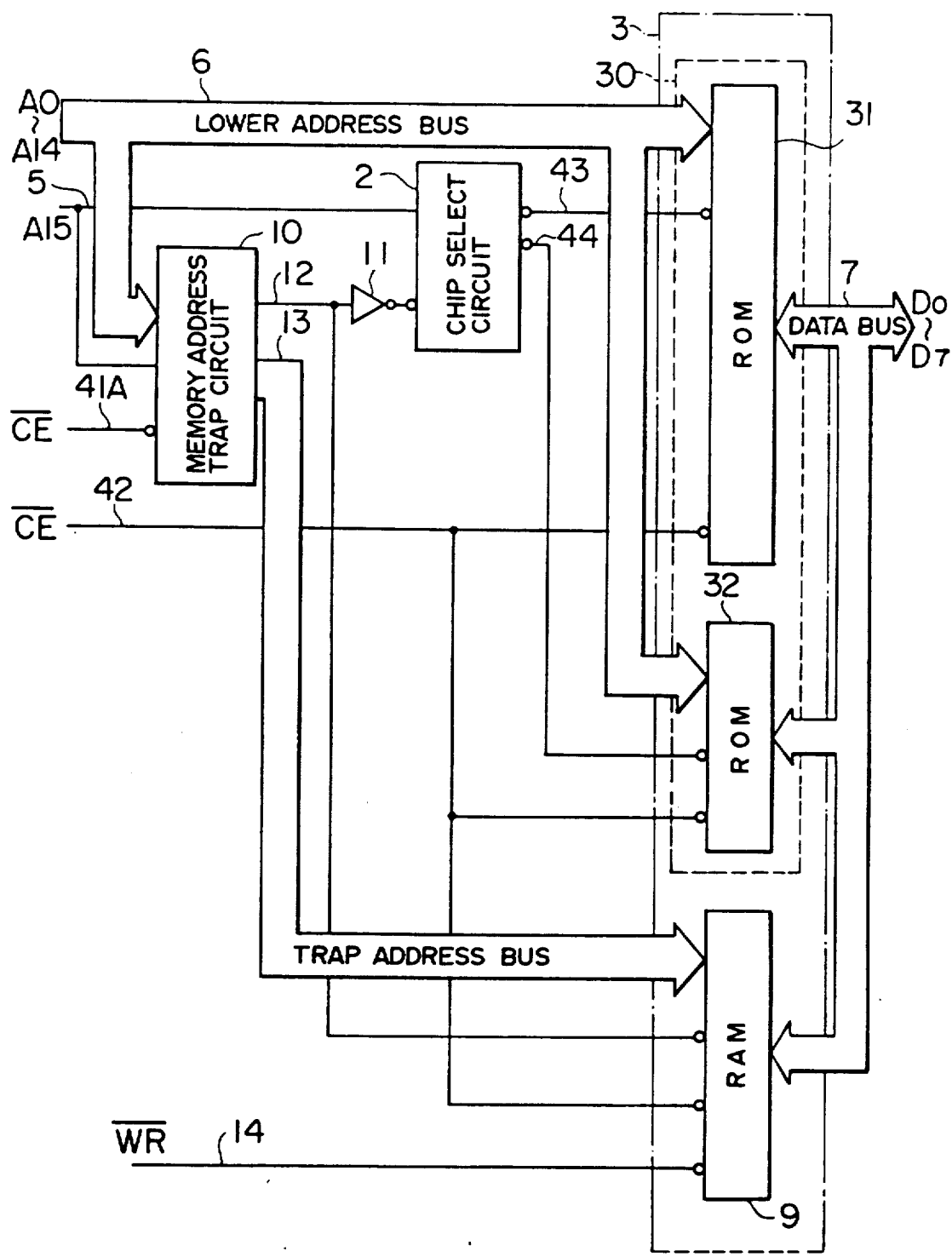
FIG. 3 is a block diagram illustrating the structure of an essential portion of an IC memory card according to an embodiment of the present invention.

FIG. 3 is a block diagram illustrating in detail the structure of an essential portion of an IC memory card according to the present invention. The structure in the vicinity of two ROM chips 31 and 32 in a memory chip 3 is illustrated in FIG. 3. Referring to FIG. 3, the same or similar parts corresponding to those used in the conventional IC memory card shown in FIG. 2 are given the same reference numerals. The IC memory card shown in FIG. 3 is further provided with a RAM chip 9 which can read and write data as a temporary memory; and a memory address trap circuit 10 for controlling data access to this RAM chip 9 when a specific address is designated. This memory address trap circuit 10 comprises an input side to which the lower address bus 6, an upper address bus or line 5, and a card select control line $\overline{CE}$ 41A are connected. This card select control line 41A exhibits a function similar to that of the card enable control line 41 shown in FIG. 2. A trap address bus 13 on the output side of the memory address trap circuit 10 is connected to the RAM chip 9. A chip switch control line 12 is connected to a chip select circuit 2 and a chip enable terminal of the RAM chip 9, and this chip switch control line 12 is connected to the chip select circuit 2 via an inverter circuit 11. As a result of provision of this inverter circuit 11 for the chip switch control line 12, data access either to a ROM portion 30 including ROM chips 31 and 32, for storing software, or to the RAM chip 9, serving as a temporary memory, can be enabled. Data access at the time of data reading for the RAM chip 9 is performed in such a manner that, when the address composed, of the lower address bus 6 and the upper address line 5, to the memory address trap circuit 10 is one of the specific addresses to bring the chip switch control line 12 into a significant condition (in this case, "L" level), a specific address area in the RAM chip 9 designated by the trap address bus 13 is addressed with a control performed by an output enable control line 42. A write enable control line $\overline{WR}$ 14 is also connected to the RAM chip 9 for the purpose of controlling data writing. Therefore, data access at the time of data writing into the RAM chip 9 is performed in such a manner that, when the address input to the memory address trap circuit 10 is a specific address, data access to the RAM chip 9 which serves a temporary memory is, similarly to the data access at the time of reading, performed as an alternative to the data access to the ROM portion 30 in which the software has been stored. That is, the chip switch control line 12 is brought into the significant condition causing the RAM chip 9 to be brought to an operable condition. The, that is, the ROM portion 30 is brought to a read/write inhibit condition. Then, the above-described specific address is, in the memory address trap circuit 10, converted to a specific address for the RAM chip 9 so that write access to the specific address in this RAM chip 9 is performed under the control of the write enable control line 14. As described above, data access to the RAM chip 9 in which rewrite can be freely performed is conducted as an alternative to data access to a partial specific address in the ROM portion. This RAM chip 9 does not necessarily require a battery for saving data. When power is newly supplied to the IC memory card, idefinite data is been stored in the RAM chip 9. Subsequently when the software which has been previously stored in the ROM portion 30 is executed, data is written in the RAM chip 9 at the time of accessing data to the above specific address in the writing operation via the computer system, such as a personal computer, to which this IC card is connected.

Figure 4:
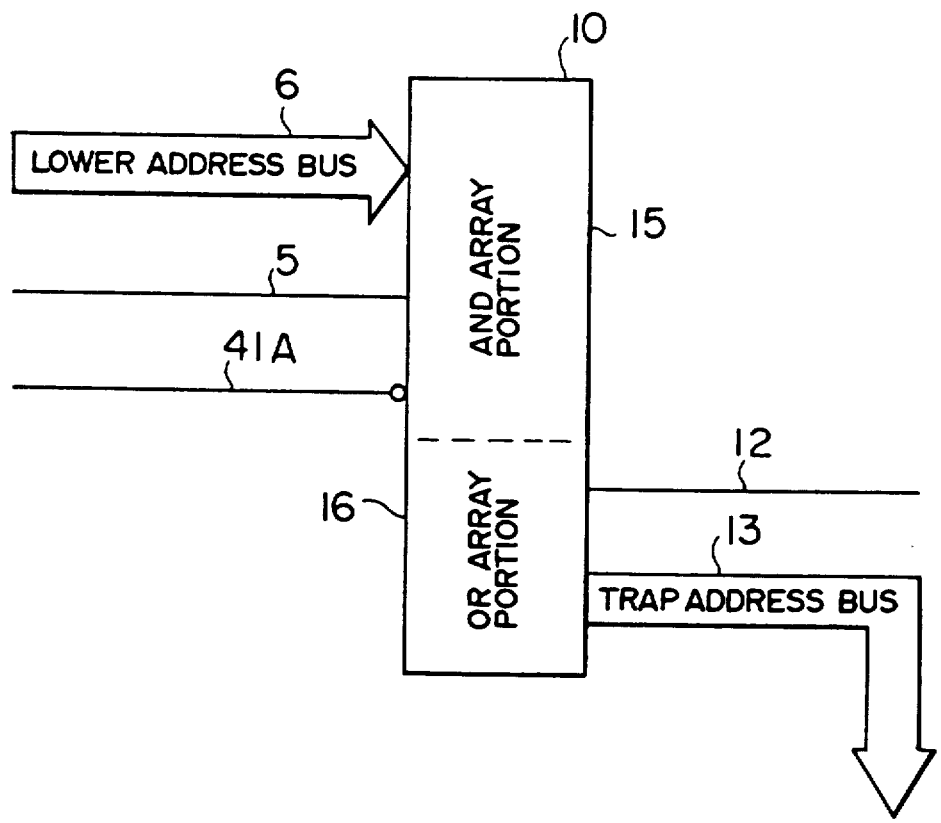
FIG. 4 is a block diagram illustrating the memory address trap circuit shown in FIG. 3 according to an embodiment of the present invention.

FIG. 4 is a block diagram for use in a case where the memory address trap circuit 10 comprises a PLA (Program Logic Array). It comprises an AND array portion 15 and an OR array portion 16 of the PLA. The AND array portion is programmed in such a manner that the RAM chip 9 is selected as an alternative to the ROM portion 30, while the OR array portion 16 is programmed with the specific address in the RAM chip 9 which corresponds to the above-described specific address. Either of the output lines from the PLA is arranged as a chip switch control signal output from the chip switch control line 12. As a result of this, when the address to the IC memory card becomes the above-described specific address in the ROM portion 30, the chip switch control line 12 is brought to a significant condition so that data access for the purpose of reading and writing the corresponding specific address of the RAM chip 9 can be enabled.

Figure 5:
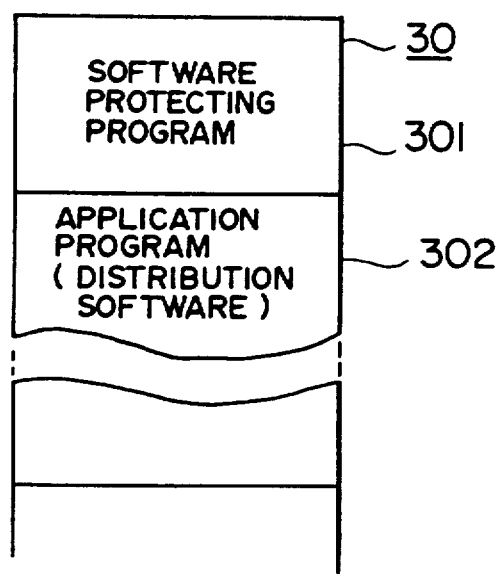
FIG. 5 illustrates a state where a program is stored in a ROM portion of the IC memory card according to the present invention.

Furthermore, as shown in FIG. 5, the ROM portion 30 includes, in addition to an application program 302 as distribution software to be protected, a software protection program 301 for protection of this application program 302. This software protection program 301 is necessarily executed before application of the execution program 302 via the execution portion in the personal computer (omitted from illustration) or the like to which this IC memory card is connected.

Figure 6:
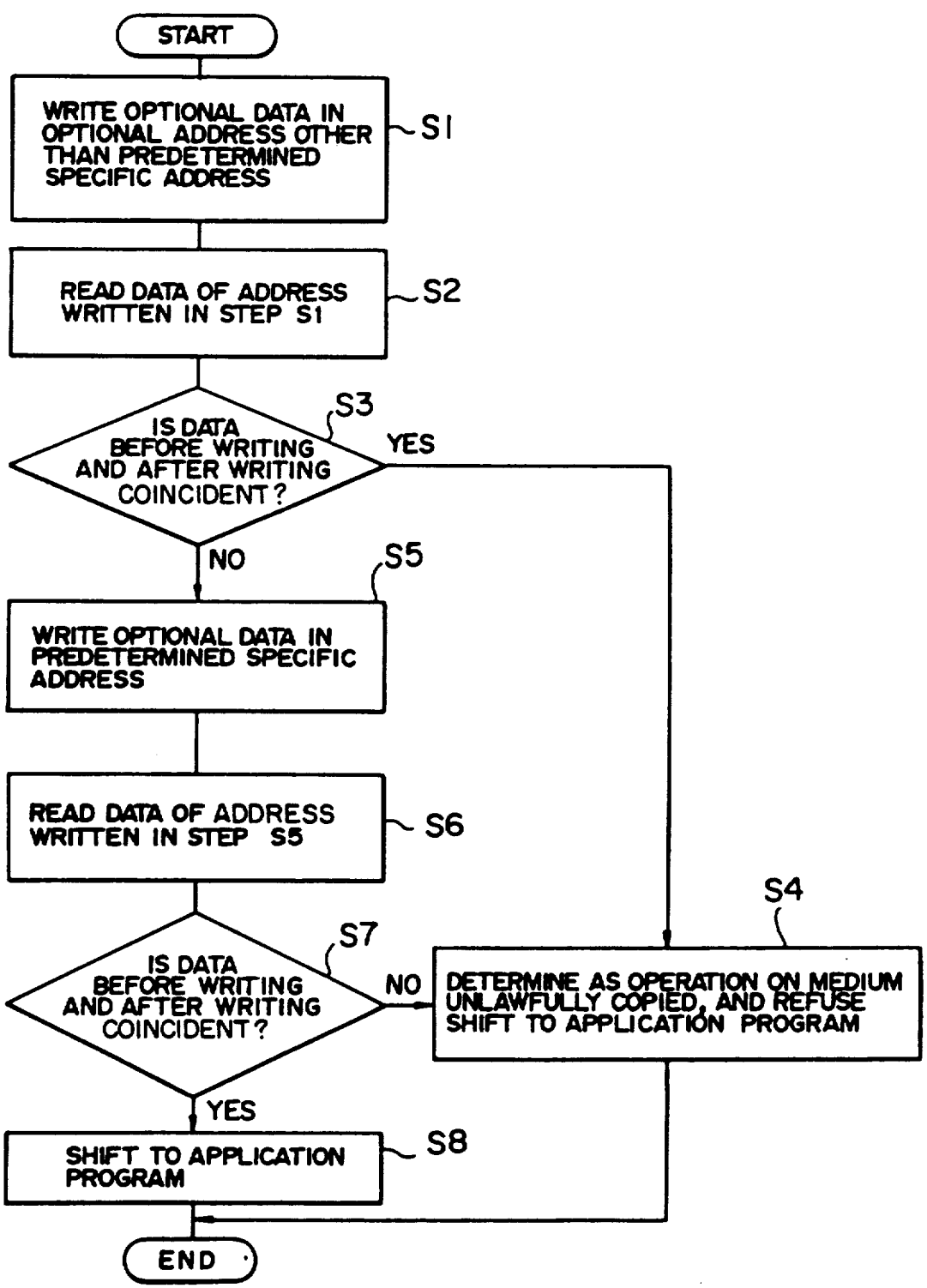
FIG. 6 is the flow chart for a software protection program shown in FIG. 5.

A flow chart of this software protection program 301 is shown in FIG. 6. The software protection program 301 is a program for self-checking, at the time of using the IC memory card, whether the software, that is, the application program 302 and the software protection program 301 themselves, has been unlawfully copied or not. If it is determined that this program has been unlawfully copied as a result of the checking, the application program 302 is not executed.

In the IC memory card according to the present invention, there are two important cases where the software stored in the ROM chip portion 3 may be unlawfully copied and executed successively in a different memory means. However, the execution of the application program in the software in the IC memory card is prevented as follows.

A first case will now be described in which the software in the IC memory card according to the present invention is copied to a medium in which read and write can be performed such as a floppy disk, hard disk, or a RAM card of a type similar to the IC memory card. In this case, its authorization is determined by a check process from step S1 to step S4 shown in FIG. 6. That is, optional data which is different from data which has been previously written in the optional address, other than the above-described specific address portion, is written in this optional address portion. When this data is read out and it is determined from a comparison that data before writing and after writing are not in agreement with each other, that is, when a write operation cannot be performed, it is determined that it is operated by an original medium which has not been copied. On the other hand, when the date coincide with each other, it is determined that the data is operated by an unlawfully copied medium. As a result of this, a shift to the ensuing application program is refused. This result is caused by the characteristic that the written data and the read out data are compared to each other when data is written. Then, the thus-written data is read in a case of a write enable medium such as floppy disk. The software itself determines whether it is unlawfully copied and, if not, refuses to be shifted to the ensuing application programs. As a result of this, use of the unlawfully copied reproductions (clones) of the application program can be prevented. Since the ROM portion has no write control line, the write operation cannot be performed if the optional address portion includes the ROM region.

Next, the second case will now be described in which the software in the IC memory card according to the present invention is copied to a medium such as a similar type of ROM card the overall memory region of which can be read out. In this case, its authorization is determined through a check from step S5 to step S8 shown in FIG. 6 which is arranged to be performed next to the above-described check. In this case, all are determined to be lawful through the check performed from step S1 to step S3. That is, writing of optional data in the above-described specific address which has been previously determined is performed. Then, the written data is read out. The data are compared both before writing and after writing. If the data are in agreement with each other, that is, when the write operation can be performed, it is determined that the software operated is on an original medium which is not a copy. On the other hand, if the data written and the data read out are not in agreement with each other, it is determined that the software operated is on a copied media so that the process shift to the application program is refused. By accessing this specific address portion, the address is converted by the memory address trap circuit 10 so that access to the specific address in the RAM chip 9 is performed. Only this specific address portion becomes the RAM region in which writing can be performed. That is, in ROM cards or the like, writing cannot be performed if any special means is provided, although the same can be performed in the RAM card. Therefore, when novel and different data are written in the ROM region and then are read out, the written data and the read out data necessarily cannot be in agreement with each other. By using this characteristic, it is determined that the software itself including the software protection program is an unlawfully copied one, and the process shift to the ensuing application program is refused. As a result of this, the use of the unlawfully copied reproduction (clones) of the application program can be prevented.

The check from step S1 to step S4 shown in FIG. 6 is arranged assuming a case where the software is copied to a medium to which writing can be performed and the check from step S5 to step S8 is arranged by assuming a case where the software is copied to a medium in which only reading can be performed may be interchanged in their sequential order.

In the above-described embodiment, although a case is described in which one RAM chip 9 is provided to the ROM portion 30, a plurality of RAM chips may be provided.

Furthermore, in the above-described embodiment, the structure is constituted in such a manner that the temporary memory (RAM region) is selected by the memory address trap circuit at the time of data-accessing to a specific address, while at the time of data-accessing to another address, memory (ROM region) for storing software is selected. On the contrary, the structure may be constituted in such manner that the memory for storing a software is selected at the time of data-accessing a specific address, while a temporary memory is selected at the time of data-accessing another address. The arrangement can be freely changed through the manner of programming the address to the memory address trap circuit. The present invention is not limited to the above-described embodiment.

Although the application program and the software protection program are individually illustrated in FIG. 5, the software protection program may be arranged as a sub-routine program of the application program, and the software protection program may be executed at the required time, such as, immediately after the execution program has been executed, and furthermore during execution of the execution program by the sub-routine control performed by the application program.

As described above, according to the present invention, an IC memory card having a plurality of ROM chips for storing distribution software (application program) includes a RAM chip as a temporary memory and a memory address trap circuit which gives data access to the specific address of the temporary RAM chip as an alternative to the data access to the ROM chip portion which stores the distribution software when a predetermined specific address is designated. As a result of this, a specific partial of the ROM is arranged to be accessed as the RAM. Furthermore, using the difference in the write characteristics between the ROM and the RAM, a check is performed to determine whether the optional address portions other than the specific address portion, are able to serve as the ROM region, when the specific address portion is able to serve as the RAM region. If desired result cannot be obtained, the distribution software is determined to be a software which has been unlawfully copied to a medium such as a floppy disk or the like in which read and write can be performed through its entire region or unlawfully copied to a medium such as a ROM card or the like in which only read through its entire region can be performed. As a result of this determination, a software protection program for preventing an actual execution of the software, that is, for preventing the process shift to the application program is stored in the ROM portion together with the application program. Consequently, an IC memory card which can prevent use of the unlawfully copied distribution software is provided.

What is claimed is:

1. An IC memory card incorporating software copy protection comprising:
    data storage means including (i) ROM (read only memory), having a plurality of addresses, for storing data including a distribution software program and from which the stored distribution software program is retrieved in response to a read signal and in which additional data cannot be stored in response to a write signal; and (ii) RAM (random access memory), having a plurality of addresses, for storing data in response to a write signal and from which stored data is retrieved in response to a read signal;
    means for supplying read signals and write signals to said data storage means;
    memory address trap means receiving write signals and read signals from said means for supplying, for storing data in and for retrieving stored data from said RAM, respectively, in response to write and read signals that include a predetermined, specific address of said data storage means and for supplying write signals and read signals including an address different from the predetermined, specific address directly to said ROM; and
    a distribution software program and a software protection program stored in said ROM, the software protection program including:
    means for generating a write signal including an address different from the predetermined, specific address for storing first data in a first memory at the predetermined, specific address, means for generating a read signal including the address different from the predetermined, specific address to retrieve the data stored in the first memory at the address different for the predetermined, specific address, means for comparing the data retrieved from the first memory at the address different from the predetermined, specific address with the first data, and means for preventing execution of the distribution software program when the data retrieved from the first memory at the address different from the predetermined, specific address is the same as the first data; and
    means for generating a write signal including the predetermined, specific address for storing second data in said RAM through said memory address trap means at the predetermined, specific address, means for generating a read signal including the predetermined, specific address to retrieve the data stored in said RAM at the predetermined, specific address, means for comparing the data retrieved from said RAM at the predetermined, specific address with the second data, and means for preventing execution of the distribution software program when the data retrieved from said RAM at the predetermined, specific address is not the same as the second data.

2. An IC memory card according to claim 1, wherein said memory address trap means comprises a program logic array.

3. An IC memory card according to claim 1 wherein said distribution software program and said software protection program are individually stored in said ROM.

4. An IC memory card according to claim 3 wherein said software protection program is stored as a sub-routine of said distribution software program in said ROM for execution immediately after execution of said distribution software program.

5. An IC memory card according to claim 3, wherein said software protection program is stored as a sub-routine of said distribution software program in said ROM for execution during execution of said distribution software program.

* * * * *